United States Patent
Ozaki et al.

(10) Patent No.: US 7,410,511 B2
(45) Date of Patent: Aug. 12, 2008

(54) PRODUCTION METHOD OF POSITIVE ELECTRODE ACTIVE MATERIAL FOR NON-AQUEOUS ELECTROLYTE SECONDARY BATTERY AND POSITIVE ELECTRODE ACTIVE MATERIAL

(75) Inventors: Yoshiyuki Ozaki, Wakayama (JP);
Yasutaka Kogetsu, Wakayama (JP);
Takaya Saito, Wakayama (JP);
Hidekazu Hiratsuka, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 516 days.

(21) Appl. No.: 10/636,642

(22) Filed: Aug. 8, 2003

(65) Prior Publication Data

US 2004/0091778 A1 May 13, 2004

(30) Foreign Application Priority Data

Aug. 8, 2002 (JP) ............................. 2002-231401

(51) Int. Cl.
*H01M 6/14* (2006.01)
*H01M 4/52* (2006.01)

(52) U.S. Cl. .................... 29/623.1; 429/223; 429/231.3; 429/231.5

(58) Field of Classification Search ................. 429/223, 429/231.3, 231.5; 29/623.1
See application file for complete search history.

(56) References Cited

U.S. PATENT DOCUMENTS 6,241,959 B1  6/2001  Cho et al.

| | | | |
|---|---|---|---|
| 6,395,250 B2 | 5/2002 | Matsubara et al. | |
| 6,416,902 B1* | 7/2002 | Miyasaka | .................. 429/223 |
| 6,773,852 B2 | 8/2004 | Cho et al. | |
| 2001/0010807 A1 | 8/2001 | Matsubara | |

FOREIGN PATENT DOCUMENTS

| CN | 1216289 A | 5/1999 |
|---|---|---|
| CN | 1232438 A | 10/1999 |
| JP | 05-242891 | 9/1993 |
| JP | 09-231973 | 9/1997 |

(Continued)

OTHER PUBLICATIONS

Chinese Office Action issued in Chinese Patent Application No. CN 031530346, dated May 9, 2008.

*Primary Examiner*—Tracy Dove
(74) *Attorney, Agent, or Firm*—McDermott Will & Emery LLP (57) ABSTRACT

A positive electrode active material, which gives a non-aqueous electrolyte secondary battery capable of high input/output where resistance due to a battery reaction in a low temperature environment is suppressed, is produced by a method comprising: (a)providing a nickel hydroxide which is represented by the general formula $Ni_{1-(x+y)}Co_xM_y(OH)_2$, (b)heating the nickel hydroxide at a temperature not lower than 600° C. and not higher than 1000° C. to produce a nickel oxide which is represented by the general formula $Ni_{1-(x+y)}Co_xM_yO$; and (c)mixing the nickel oxide and a lithium compound to obtain a mixture and heating the mixture at a temperature not lower than 700° C. and not higher than 850° C. to produce a lithium-containing composite oxide which is represented by the general formula $LiNi_{1-(x+y)}Co_xM_yO_2$, where $0.1 \leq x \leq 0.35$ and $0.03 \leq y \leq 0.2$ are satisfied and M is at least one selected from the group consisting of Al, Ti and Sn.

3 Claims, 3 Drawing Sheets

FOREIGN PATENT DOCUMENTS

| | | |
|---|---|---|
| JP | 09-237631 | 9/1997 |
| JP | 09-293497 | 11/1997 |
| JP | 10-27611 | 1/1998 |
| JP | 10027611 A * | 1/1998 |
| JP | 11-60244 | 3/1999 |
| JP | 11-219706 | 8/1999 |

* cited by examiner

PRODUCTION METHOD OF POSITIVE ELECTRODE ACTIVE MATERIAL FOR NON-AQUEOUS ELECTROLYTE SECONDARY BATTERY AND POSITIVE ELECTRODE ACTIVE MATERIAL

BACKGROUND OF THE INVENTION

In recent years, as having a high operation voltage and high energy density, non-aqueous electrolyte secondary batteries, especially lithium-ion secondary batteries, have come into practical use as power sources for driving portable electronic instruments such as cell phones, laptop computers, video camcoders, and have made rapid progress. Lithium-ion secondary batteries are becoming the mainstream of small-sized secondary batteries and the production volume thereof is on the increase.

Lithium-ion secondary batteries are not only for small-sized customer applications, but the technical development thereof into large-sized batteries having a large capacity for power storage, electric vehicles and the like has been accelerated, and in particular, lithium-ion secondary batteries for hybrid electric vehicles (HEVs) are under rapid development. Furthermore, in the area of power-sources for driving electric tools and the like, required to have very high output power, high-output type lithium-ion secondary batteries as replacements of conventional nickel-cadmium batteries and nickel-metal hydride batteries are under rapid development.

Herein, the aforesaid high-output type lithium-ion secondary batteries largely differ in applications and required performance from lithium-ion secondary batteries for small-sized customer applications. In the case of lithium-ion secondary batteries for HEVs, for example, an engine of an HEV needs power-assisting and regenerating within a fraction of a second with a limited capacity of the battery, necessitating considerably high input/output power of the battery. It is therefore necessary to give preference to a high input/output characteristic over the other battery characteristics, and to make the internal resistance of the battery as small as possible.

Consequently, in addition to development and selection of active materials and electrolytes, there have been attempted reconsideration of current collecting structures of electrodes, reduction in resistance of battery constituents, an increase in electrode reaction area by making the electrode thinner and longer, and the like.

As for positive electrode active materials of the lithium-ion secondary batteries for HEVs, $LiNiMO_2$ type active materials have been considered as most suitable—and the development thereof has been advanced (e.g. Japanese Laid-Open Patent Publication No. Hei 5-242891, Japanese Laid-Open Patent Publication No. Hei 9-231973, Japanese Laid-Open Patent Publication No. Hei 9-293497, and Japanese Laid-Open Patent Publication No. Hei 9-237631). There have further been conducted studies on production methods of the $LiNiMO_2$ type active materials (e.g. Japanese Laid-Open Patent Publication No. Hei 10-27611, Japanese Laid-Open Patent Publication No. Hei 11-60244, and Japanese Laid-Open Patent Publication No. Hei 11-219706).

As thus described, the lithium-ion secondary battery required to have high input/output power needs to sustain large current pulse charge or discharge from about 50% state of charge. It is thereby necessary to make the internal resistance of the battery as small as possible.

The internal resistance of the battery here is comprised of: a resistance element due to battery constituents, an electrolyte and the like; and a resistance element due to a battery reaction. The internal resistance of the battery occurring within the temperature range of a normal temperature to a high temperature can be reduced by reducing the former resistance element, thereby enabling the battery to have high input/output power. In the case of the internal resistance of the battery occurring within the low temperature range of 0° C. and below, however, the latter resistance element due to a battery reaction contributes far more than the former resistance element, making it difficult for the battery to have high input/output power without reduction in the latter resistance element.

Some of the aforesaid conventional $LiNiMO_2$ type active materials are produced by mixing nickel hydroxide, a compound containing the element M to be incorporated in the nickel hydroxide, and a lithium compound such as lithium hydroxide, and heating the mixture. Further, some of the aforesaid $LiNiMO_2$ type active materials are produced by preparing $NiM(OH)_2$, incorporated with M by a coprecipitation method, mixing prepared $NiM(OH)_2$ with a lithium compound, and then heating the mixture. The $LiNiMO_2$ active materials thus obtained are somewhat different in performance, depending on the kind of M, composition and the like, but not largely different in physical properties, and it is therefore difficult to suppress the aforesaid increase in resistance due to a battery reaction in a low temperature environment. For example, when conductivity of an electrolyte excessively decreases at a low temperature, the ability of the active material to absorb and desorb lithium significantly deteriorates, leading to an unsatisfactory high input/output characteristic of the battery.

BRIEF SUMMARY OF THE INVENTION

In view of the aforesaid circumstances, the present inventors analyzed the resistance element due to a battery reaction in a low temperature environment. As a result found was that a positive electrode active material is a dominant cause of a larger increase in resistance due to a battery reaction at low temperatures than that at normal temperatures, during large current pulse charge or discharge, and that the influence of the positive electrode active material was far greater than those of an electrolyte, negative electrode active material and the like.

An object of the present invention is to provide a positive electrode active material giving a non-aqueous electrolyte secondary battery capable of high input/output, in which an increase in resistance due to a battery reaction especially in a low temperature environment of 0° C. or below is suppressed.

That is to say, the present invention relates to a production method of a positive electrode active material for a non-aqueous electrolyte secondary battery, comprising: (a) a step for obtaining a nickel hydroxide (x) represented by the general formula: $Ni_{1-(x+y)}Co_xM_y(OH)_2$, where $0.1 \leq x \leq 0.35$ and $0.03 \leq y \leq 0.2$ are satisfied and M is at least one selected from the group consisting of Al, Ti and Sn; (b) a step for obtaining a nickel oxide (y) represented by the general formula: $Ni_{1-(x+y)}Co_xM_yO$, where $0.1 \leq x \leq 0.35$ and $0.03 \leq y \leq 0.2$ are satisfied and M is at least one selected from the group consisting of Al, Ti and Sn, by heating the nickel hydroxide (x) at a temperature not lower than 600° C. and not higher than 1000° C. and (c) a step for obtaining a lithium-containing composite oxide (z) represented by the general formula: $LiNi_{1-(x+y)}Co_xM_yO_2$, where $0.1 \leq x \leq 0.35$ and $0.03 \leq y \leq 0.2$ are satisfied and M is at least one selected from the group consisting of Al, Ti and Sn, by heating a mixture of the nickel oxide (y) and a lithium compound at a temperature not lower than 700° C. and not higher than 850° C.

According to the method of the present invention, a lithium-containing composite oxide can be produced wherein primary particles agglomerate to form secondary particles in spherical, almost spherical or oval shape, the primary particles have a mean particle size of not smaller than 0.3 μm and not larger than 1 μm, the secondary particles have a mean particle size of not smaller than 5 μm and not larger than 15 μm, and the specific surface area of the lithium-containing composite oxide, measured by a BET method based on adsorption of nitrogen, is not smaller than 0.3 m²/g and not larger than 0.8 m²/g.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the following, a production method of a positive electrode active material enabling production of a non-aqueous electrolyte secondary battery (especially a lithium-ion secondary battery) excellent in high input/output characteristic.

The production method of the present invention comprises at least a step (a) for obtaining a nickel hydroxide, a step (b) for obtaining a nickel oxide and a step (c) for obtaining a lithium-containing composite oxide. That is to say, in the production method of the present invention, a lithium-containing composite oxide is produced by heating a nickel hydroxide to obtain a nickel oxide in advance and then heating a mixture of the obtained nickel oxide and a lithium compound. The physical properties of the lithium-containing composite oxide thus obtained vary to a large extent from those of a conventional one, thereby giving a positive electrode active material which is capable of improving a low-temperature input/output characteristic substantially.

In the step (a) produced is a nickel hydroxide represented by the general formula: $Ni_{1-(x+y)}Co_xM_y(OH)_2$, where $0.1 \leq x \leq 0.35$ and $0.03 \leq y \leq 0.2$ are satisfied and M is at least one selected from the group consisting of Al, Ti and Sn.

The nickel hydroxide is a solid solution of nickel hydroxide containing Co and the element M. Optimization of the amounts of Co and the element M contained in the solid solution allows stabilization of the crystal structure. With such a solid solution in use, it is possible to obtain a long-life positive electrode active material allowing high input/output power. It is to be noted that Al is most preferable as the element M, and with Al used as the element M, the effect of the present invention can be most readily obtained.

A typical method for obtaining a solid solution of nickel hydroxide containing metal elements other than Ni comprises mixing of salts or oxides of the respective metal elements and heating of the resultant mixture. In order to dissolve the different elements from Ni in nickel hydroxide uniformly on the atomic level, however, it is preferable that an aqueous solution dissolving the salts of the respective metal elements is neutralized to coprecipitate a hydroxide. The coprecipitation allows uniform distribution of the different elements in the nickel hydroxide and also production of a single-phase active material. Especially when Co and the element M are contained in the nickel hydroxide in large amounts, it is difficult to obtain a single-phase active material by the typical method of mixing raw materials and heating the mixture.

Specifically, it is preferable that the step (a) comprises a step for coprecipitating a ternary composite hydroxide by neutralizing an aqueous solution dissolving a nickel salt, a cobalt salt and an M salt, and a step for drying the ternary composite hydroxide.

Although there is no particular limitation to the total concentration of the nickel salt, the cobalt salt and the M salt in the aqueous solution, it is preferably 0.01 mol/L or more. Although there is also no particular limitation to a temperature of the aqueous solution during the neutralization, it is preferably from 20 to 50° C.

The nickel salt to be used may be exemplified by nickel sulfate, nickel nitrate and nickel oxalate. They may be used singly or in combination of two or more of them.

The cobalt salt to be used may be exemplified by cobalt sulfate, cobalt nitrate and cobalt oxalate. They may be used singly or in combination of two or more of them.

The M salt to be used may be exemplified by aluminum sulfate, aluminum nitrate, aluminum oxalate, titanium sulfate and tin sulfate. They may be used singly or in combination of two or more or them.

Although a temperature at which the ternary composite hydroxide is dried is not particularly limited, it is preferably from 80 to 120° C. Although depending on the drying temperature, the drying time is preferably from 5 to 50 hours.

It is preferable that the obtained hydroxide comprises primary particles with a mean particle size of 0.01 to 1 μm and secondary particles with a mean particle size ($D_{50}$ based on volume standard) of 5 to 20 μm, and has a BET surface area, measured based on adsorption of nitrogen, of 1 to 50 m²/g. Herein, the mean particle size of primary particles can be obtained by a microphotograph of the hydroxide, for example.

In the step (b), a nickel oxide represented by the general formula: $Ni_{1-(x+y)}Co_xM_yO$, where $0.1 \leq x \leq 0.35$ and $0.03 \leq y \leq 0.2$ are satisfied and M is at least one selected from the group consisting of Al, Ti and Sn, is produced by heating the nickel hydroxide obtained in the step (a) at a temperature not lower than 600° C. and not higher than 1000° C.

In the production method of the present invention, heating the nickel hydroxide at a temperature not lower than 600° C. and not higher than 1000° C. has the greatest significance. While it is possible to convert the nickel hydroxide into nickel oxide even at a temperature lower than 600° C., this may result in production of a lithium-containing composite oxide as a final product with an insufficient high input/output characteristic. At a temperature higher than 1000° C., on the other hand, production facilities become more complex and the produced nickel oxide is sintered, resulting in poor reactivity of the nickel oxide with the lithium compound. From the viewpoint of obtaining an optimum positive electrode active material, the nickel hydroxide is heated preferably at a temperature not lower than 800° C. and not higher than 950° C.

Although depending on the heating temperature, the time for heating the nickel hydroxide is preferably from 1 to 50 hours. Further, although no particular limitation is set to an atmosphere in which the nickel hydroxide is heated, an atmosphere having an oxygen concentration of 20% or higher is preferable.

In the step (c), a lithium-containing composite oxide represented by the general formula: $LiNi_{1-(x+y)}Co_xM_yO_2$, where $01 \leq x \leq 0.35$ and $0.03 \leq y \leq 0.2$ are satisfied and M is at least one selected from the group consisting of Al, Ti and Sn, is produced by heating a mixture of the nickel oxide obtained in the step (b) and a lithium compound at a temperature not lower than 700° C. and not higher than 850° C.

In the production method of the present invention, heating the mixture of the nickel oxide and the lithium compound at a temperature not lower than 700° C. and not higher than 850° C. also has a great significance. For, the reaction is insufficient at a temperature lower than 700° C. whereas the crystal structure changes to increase the probability that Li will position in the site of Ni at a temperature higher than 850° C. Heating the mixture at a temperature out of the temperature range of 700° C. to 850° C. therefore results in lowering of a capacity density of the positive electrode as well as an increase in resistance due to a battery reaction.

Although depending on the heating temperature, the time for heating the mixture of the nickel oxide and the lithium compound is preferably from 1 to 50 hours. Further, although no specific limitation is set to an atmosphere in which the mixture of the nickel oxide and the lithium compound is heated, an atmosphere having an oxygen concentration of 20% or higher is preferable.

There having been no particular limitation to the lithium compound, lithium hydroxide or the hydrate thereof, lithium carbonate, lithium sulfate, lithium nitrate, lithium peroxide, lithium acetate, lithium citrate and the like can for example be used. They may be used singly or in combination with one or more of them.

It should be noted that when the value x representing a content of Co falls below 0.1, a margin of volume variation of a unit lattice, accompanied by charge/discharge, increases. When the value exceeds 0.35, on the other hand, the ability of the active material to trap lithium ions is weakened, decreasing a charge/discharge capacity. The value x preferably satisfies $0.15 \leq x \leq 0.25$.

When the value y representing a content of M falls below 0.03, the ability of the active material to trap oxygen is weakened, lowering safety. When the value y exceeds 0.2, on the other hand, crystallite becomes distorted to cause deterioration in diffusibility of lithium in the active material, leading to an insufficient rate characteristic. The value y preferably satisfies $0.1 \leq y \leq 0.2$.

Next, physical properties of an active material obtained by the production method of the present invention is described.

A lithium-containing composite oxide obtained by a conventional production method normally comprises primary particles with particle sizes smaller than 0.1 to 0.3 μm, and secondary particles are formed by agglomeration of the primary particles. Accordingly, the specific surface area of the conventional lithium-containing composite oxide normally exceeds 1 m²/g.

According to a production method of the present invention, on the other hand, growth of primary particles, namely crystallinity, is significantly advanced, making the primary particles of the lithium-containing composite oxide larger and the specific surface area thereof relatively smaller. It is thought that this results in thicker crystallites and a smaller quantity of particle boundary so that a conductive path of Li ions is made stronger or rigid to reduce the resistance element due to a battery reaction.

Specifically, in the lithium-containing composite oxide obtained by a production method of the present invention, primary particles agglomerate to form secondary particles in spherical, almost spherical or oval shape. The primary particles have a mean particle size of not smaller than 0.3 μm and not larger than 1 μm, for example, and more preferably from 0.5 to 0.8 μm, while the secondary particles have a mean particle size of not smaller than 5 μm and not larger than 15 μm, for example, and more preferably from 7 to 10 μm. Further, the specific surface area of the lithium-containing composite oxide measured by a BET method based on adsorption of nitrogen for example is not smaller than 0.3 m²/g and not larger than 0.8 m²/g.

Combination of a positive electrode comprising the aforesaid lithium-containing composite oxide as a positive electrode active material, an electrolyte, and a negative electrode comprising a carbon material capable of absorbing and desorbing lithium gives a non-aqueous electrolyte secondary battery having an excellent high input/output characteristic.

In the following, the present invention is described by the use of examples.

EXAMPLE 1

A lithium nickel composite oxide, represented by the composition formula: $LiNi_{0.7}Co_{0.2}Al_{0.1}O_2$, was produced as a positive electrode active material.

(i) Production of Nickel Hydroxide

Sulfates of Co and Al in a prescribed ratio were added into an $NiSO_4$ aqueous solution to prepare a saturated aqueous solution. The saturated aqueous solution was kept at 25° C. and a sodium hydroxide aqueous solution was gradually added dropwise thereonto, while stirring, to be neutralized for coprecipitation of a ternary composite hydroxide $Ni_{0.7}Co_{0.2}Al_{0.1}(OH)_2$. The resultant precipitate was filtrated, washed with water and then dried at 80° C. for 24 hours. The obtained ternary composite hydroxide comprised primary particles with a mean particle size of about 0.1 μm that formed secondary particles with a mean particle size of about 10 μm, and had a BET specific surface area of 20 m²/g.

(ii) Production of Nickel Oxide

The ternary composite hydroxide $Ni_{0.7}Co_{0.2}Al_{0.1}(OH)_2$ was heated at 900° C. in the air atmosphere for 10 hours to obtain a ternary composite oxide $Ni_{0.7}Co_{0.2}Al_{0.1}O$. It was confirmed by a powder X-ray diffraction method that the obtained oxide was a single phase of a nickel hydroxide solid solution containing Co and Al.

(iii) Production of Lithium-nickel Composite Oxide

In such a manner that a sum of the numbers of Ni, Co and Al atoms was equivalent to the number of Li atoms, the ternary composite oxide $Ni_{0.7}Co_{0.2}Al_{0.1}O$ was added with lithium hydroxide, 1-hydrate and then heated at 800° C. in the air for 10 hours to obtain $LiNi_{0.7}Co_{0.2}Al_{0.1}O_2$ as an object compound. It was confirmed by a powder X-ray diffraction method that the obtained lithium-nickel composite oxide was a solid solution containing Co and Al while having a layered hexagonal structure of a single phase.

(iv) Physical Properties of Lithium-nickel Composite Oxide

The obtained lithium-nickel composite oxide was ground and classified to give a positive electrode active material powder. This active material powder comprised primary particles with a mean particle size of 0.7 μm and secondary particles with a mean particle size of 9.5 μm, and had a BET specific surface area of 0.4 m$^2$/g.

Figure 1A:
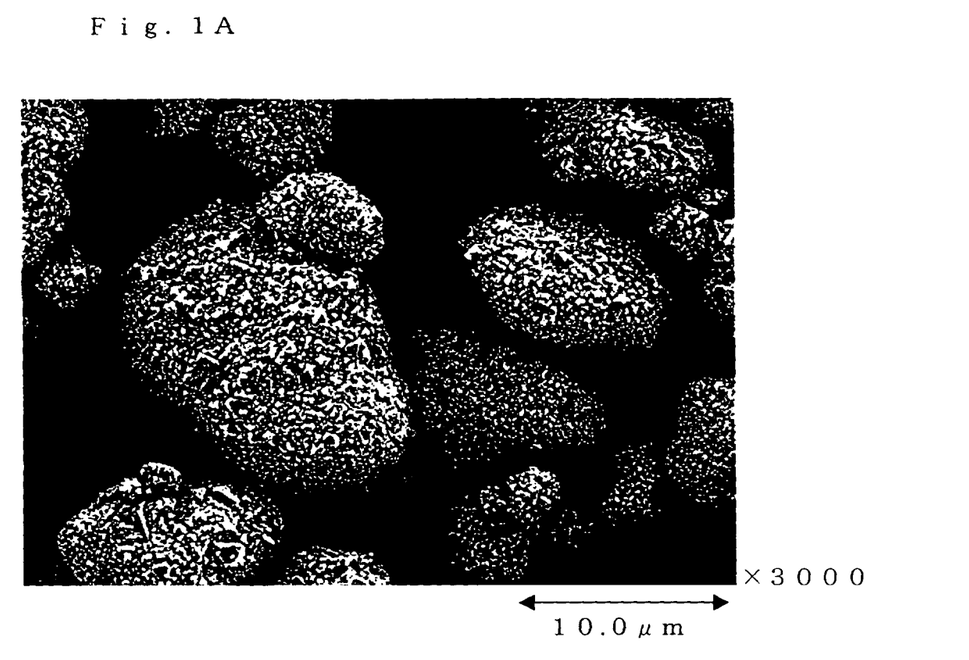
FIG. 1A is a scanning electron microphotograph at a magnification of 3000 times of a positive electrode active material in accordance with an example of the present invention.

FIG. 1A shows a scanning electron microphotograph at a magnification of 3000 times of the active material powder in accordance with the present example. Further, FIG. 1B shows a scanning electron microphotograph at a magnification of 30000 times of the active material powder in accordance with the present example.

Figure 1B:
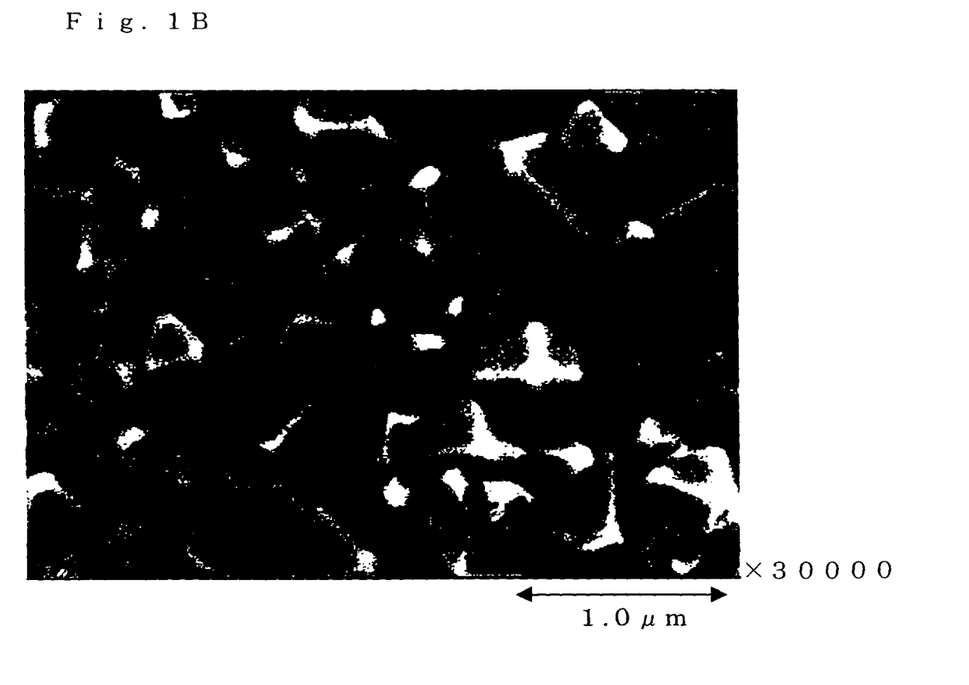
FIG. 1B is a scanning electron microphotograph at a magnification of 30000 times of a positive electrode active material in accordance with an example of the present invention.

It is found from FIG. 1 that a large number of primary particles with particle sizes of about 0.3 to 1.0 μm have aggregated to form secondary particles in spherical, almost spherical or oval shape.

(v) Production of Positive Electrode Plate 100 parts by weight of the obtained active material powder was mixed with 3 parts by weight of acetylene black as a conductive material and a solution of N-methyl-2-pyrrolidone (NMP) where polyvinylidene fluoride (PVdF) as a binder were dissolved, and the mixture was kneaded to give a positive electrode mixture paste. It is to be noted that PVdF was added in an amount of 4 parts by weight to 100 parts by weight of the active material powder.

Subsequently, the resultant positive electrode mixture paste was applied onto each face of aluminum foil, followed by drying and pressing, to give a positive electrode plate having a thickness of 0.075 mm, a mixture width of 41 mm and a length of 2800 mm.

(vi) Production of Negative Electrode Plate

As for a negative electrode used was a non-graphitizing carbon, produced by heating a raw material comprising isotropic pitch. The non-graphitizing carbon had a mean particle size of about 10 μm, a spacing (d002) between (002) lattice planes, measured by a powder X-ray diffraction method, of 0.380 nm, and a true density of 1.54 g/cc.

The negative electrode plate was produced in almost the same manner as in the production of the positive electrode plate. That is, the non-graphitizing carbon and a solution of NMP with PVdF dissolved therein were mixed and kneaded to give a negative electrode mixture paste. It should be noted that PVdF was added in an amount of 8 parts by weight to 100 parts by weight of the non-graphitizing carbon.

Next, the resultant negative electrode mixture paste was applied onto each face of copper foil, followed by drying and pressing, to give a negative electrode plate having a thickness of 0.110 mm, a mixture width of 46 mm and a length of 2910 mm.

(vii) Preparation of Non-aqueous Electrolyte

One mol/L of LiPF$_6$ as a solute was dissolved in a solvent prepared by mixing propylene carbonate (PC) with dimethyl carbonate (DMC) in a volume ratio of 1:1, to obtain a non-aqueous electrolyte.

(viii) Production of Lithium-ion Secondary Battery

The positive electrode plate and the negative electrode plate were spirally wound with a separator, comprising a polyethylene-made porous membrane having a thickness of 0.027 mm and a width of 50 mm, interposed therebetween to constitute a cylindrical electrode plate assembly. This electrode plate assembly was housed in a battery case having a diameter of 32 mm and a height of 61.5 mm and electric leads were then connected to predetermined portions. Subsequently, the non-aqueous electrolyte was poured into the battery case and the opening thereof was then sealed with a sealing plate to give Battery A.

COMPARATIVE EXAMPLE 1

The same ternary composite hydroxide Ni$_{0.7}$Co$_{0.2}$Al$_{0.1}$(OH)$_2$ as in EXAMPLE 1 was produced. In such a manner that a sum of the numbers of Ni, Co and Al atoms was equivalent to the number of Li atoms, the ternary composite hydroxide was added with lithium hydroxide, 1-hydrate and then heated at 800° C. in dry air for 10 hours to obtain LiNi$_{0.7}$Co$_{0.2}$Al$_{0.1}$O$_2$ as an object compound. It was confirmed by a powder X-ray diffraction method that the obtained lithium-nickel composite oxide was a solid solution containing Co and Al while having a layered hexagonal structure of a single phase.

The obtained lithium-nickel composite oxide was ground and classified to give a positive electrode active material powder. This active material powder comprised primary particles with a mean particle size of 0.2 μm and secondary particles with a mean particle size of 9.3 μm, and had a BET specific surface area of 0.9 m$^2$/g.

Figure 2A:
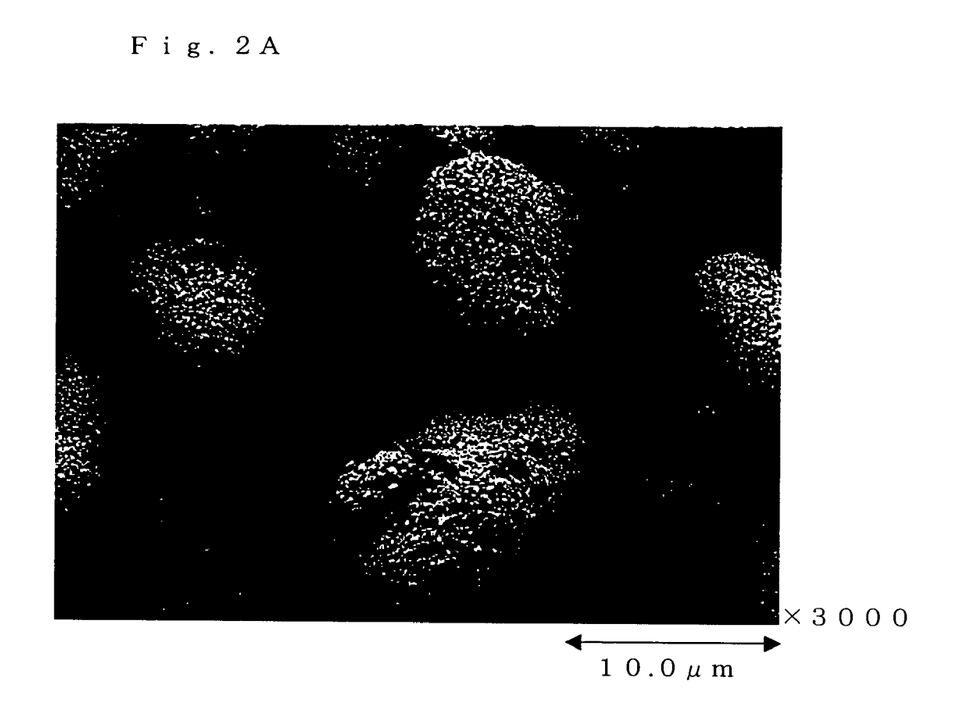
FIG. 2A is a scanning electron microphotograph at a magnification of 3000 times of a conventional positive electrode active material.

FIG. 2A shows a scanning electron microphotograph at a magnification of 3000 times of the active material powder (conventional active material powder) in accordance with the present comparative example. Further, FIG. 2B shows a scanning electron microphotograph at a magnification of 30000 times of the active material powder in accordance with the present comparative example.

Figure 2B:
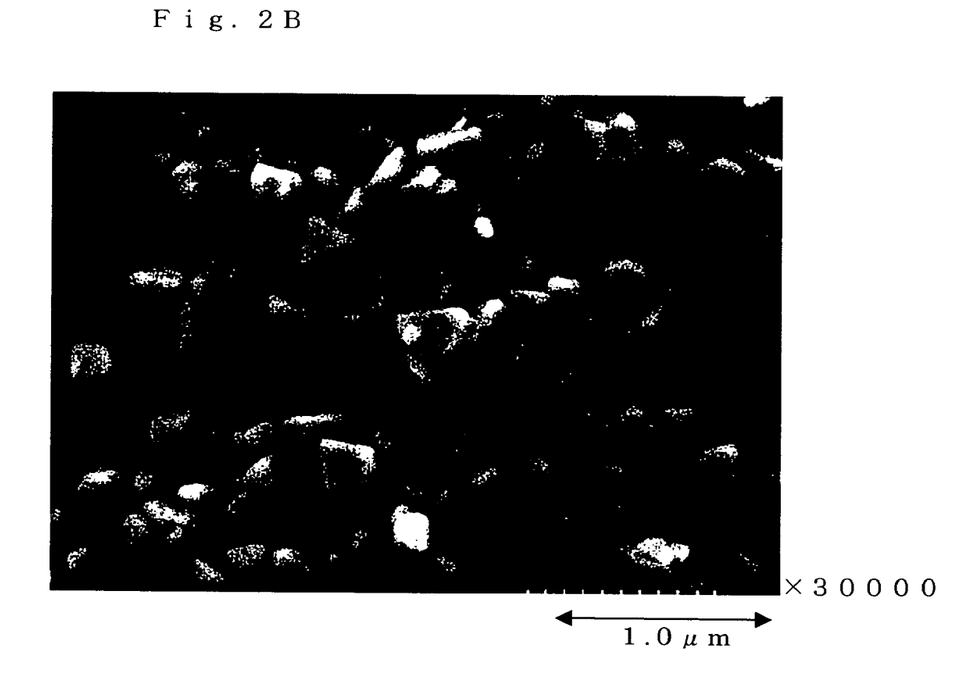
FIG. 2B is a scanning electron microphotograph at a magnification of 30000 times of a conventional positive electrode active material.

It is found from FIG. 2 that a large number of very small primary particles with particle sizes smaller than 0.3 μm have aggregated to form secondary particles in spherical, almost spherical or oval shape.

Except that the active material thus obtained was used, a lithium-ion secondary battery was constituted under the same conditions as the constitution of Battery A in EXAMPLE 1, and referred to as Battery B.

COMPARATIVE EXAMPLE 2

A binary composite hydroxide, not containing Al, Ni$_{0.8}$Co$_{0.2}$(OH)$_2$ was prepared and heated at 900° C. in the air atmosphere for 10 hours to obtain a binary composite oxide Ni$_{0.8}$Co$_{0.2}$O.

In such a manner that a sum of the numbers of Ni and Co atoms was equivalent to the number of Li atoms, the binary composite oxide Ni$_{0.8}$Co$_{0.2}$O was added with lithium hydroxide, 1-hydrate and then heated at 800° C. in dry air for 10 hours to obtain LiNi$_{0.8}$Co$_{0.2}$O$_2$.

Except that the active material thus obtained was used, a lithium-ion secondary battery was constituted under the same conditions as the constitution of Battery A in EXAMPLE 1, and referred to as Battery C.

COMPARATIVE EXAMPLE 3

The same ternary composite hydroxide Ni$_{0.7}$Co$_{0.2}$Al$_{0.1}$(OH)$_2$ as in EXAMPLE 1 was produced. This ternary composite hydroxide was heated at 500° C. in the air atmosphere for 10 hours to obtain a ternary composite oxide Ni$_{0.7}$Co$_{0.2}$Al$_{0.1}$O.

Except that the ternary composite oxide obtained in the aforesaid manner of heating at the low temperature was used, a lithium-nickel composite oxide LiNi$_{0.7}$Co$_{0.2}$Al$_{0.1}$O$_2$ was obtained under the same conditions as in EXAMPLE 1.

This lithium-nickel composite oxide was ground and classified to give a positive electrode active material powder. The active material powder comprises primary particles with a mean particle size smaller than 0.3 μm and secondary particles with a mean particle size of 9.5 μm, and had a BET specific surface area of 0.7 m²/g.

Except that the active material thus obtained was used, a lithium-ion secondary battery was constituted under the same conditions as the constitution of Battery A in EXAMPLE 1, and referred to as Battery D.

[Evaluation of Battery]

(i) Battery Capacity

Batteries A to D were submitted to 3 charge/discharge cycles at 25° C. in conditions of a constant current of 400 mA, an upper limit charging voltage of 4.2 V and a lower limit charging voltage of 2.5 V. The respective capacities of Batteries A to D were all confirmed to be about 2 Ah.

(ii) Direct Current Internal Resistance

Figure 3:
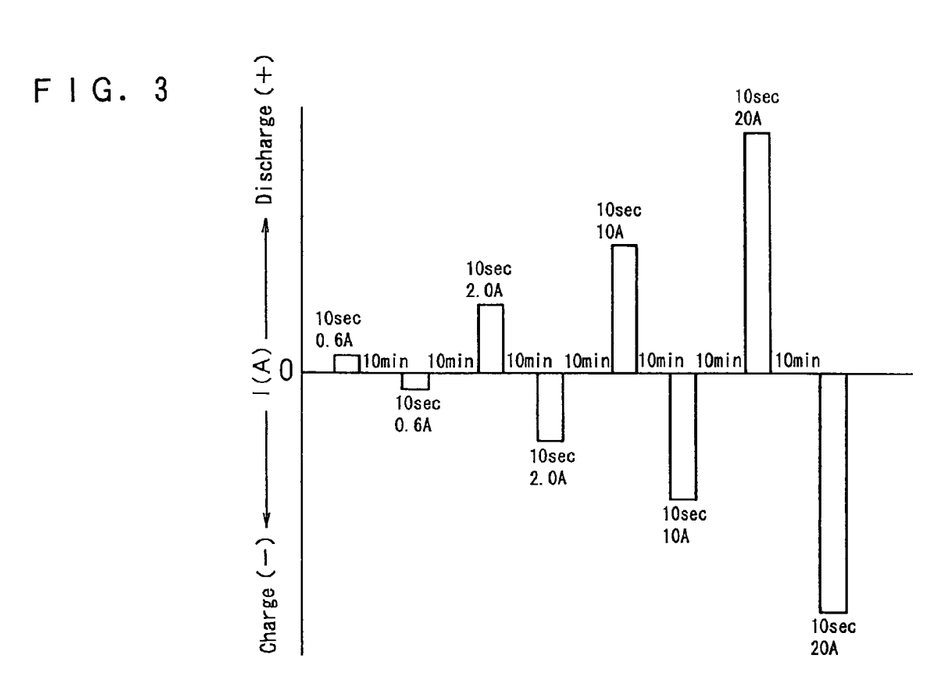
FIG. 3 is a diagram showing repeated pulse patterns in a current-voltage characteristic test.

For measurement of direct current internal resistance of Batteries A to D, a current-voltage characteristic test was conducted according to the following procedure:

First, each battery was charged at a constant current until becoming 60% state of charge (SOC), and discharge/charge pulses were repeatedly applied to the battery as shown in FIG. 3. A voltage was measured 10 seconds after application of each pulse, and the measured voltages were plotted with respect to the current values.

Figure 4:
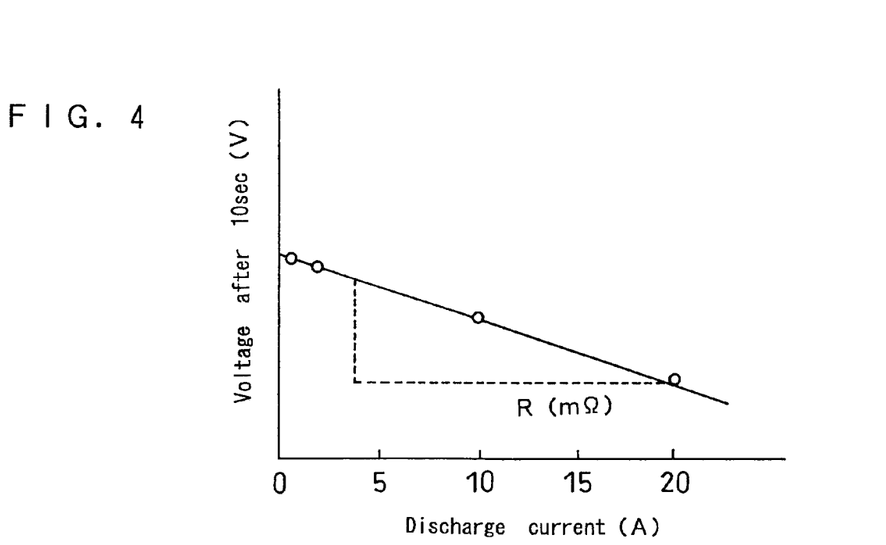
FIG. 4 is a diagram showing a calculation method of direct current internal resistance of a battery.

Next, as shown in FIG. 4, an approximate straight line along the voltage plots on the discharge pulse side was determined, using a least square method. A gradient of the approximate straight line was referred to as direct current internal resistance.

The direct current internal resistance was measured at two ambient temperatures, 25° C. and 0° C. The results are shown in Table 1.

TABLE 1

| Battery | Direct current internal resistance (mΩ) | |
|---|---|---|
| | 25° C. | 0° C. |
| A | 10.9 | 16.3 |
| B | 12.2 | 25.1 |
| C | 12.8 | 25.8 |
| D | 11.9 | 23.5 |

It is found from the results shown in Table 1 that the direct current internal resistance of Battery A was very small and high output can therefore be obtained. The direct current internal resistance of Battery A, particularly in a low temperature environment of 0° C., was extremely small as compared with the direct current internal resistance of the other batteries. Namely, poor performance of a battery at a low temperature, which is a drawback of conventional lithium-ion-secondary batteries, has been improved extensively in Battery A.

It is understood from the result of Battery C that in using a binary oxide of Ni and Co, not containing Al, the effect of having high output power cannot be obtained even when the hydroxide is heated at a high temperature.

It is found from the result of Battery D that, although it is possible to produce a composite oxide when a hydroxide was heated at a temperature as low as 500° C., the use of a lithium-nickel composite oxide, produced using the above-produced composite oxide, for the positive electrode leads to little obtainment of the effect of reducing direct current internal resistance.

Accordingly, setting up a high temperature for heating a nickel hydroxide to produce a nickel oxide is found to be a very important factor of the present invention.

It should be noted that the mechanism of achieving high output in a non-aqueous electrolyte secondary battery comprising the positive electrode active material produced according to a production method of the present invention remains incompletely clarified. It is considered, however, that the use of a highly crystalline nickel oxide having been heated at a high temperature not lower than 600° C. and not higher than 1000° C. as a precursor facilitates regular array of the atom sites of Li and Ni at the time of the reaction with a lithium compound so that a highly crystalline active material can be obtained. It is further thought that the mobility of Li ions improves to facilitate formation of a conductive path.

Moreover, the increase in primary particle size of the active material to as large as about 1.0 μm indicates that the present invention can provide an active material with developed crystallite.

EXAMPLE 2

A positive electrode active material was produced under the same conditions as in Example 1, except that the contents of Ni, Co and Al in nickel hydroxide, a temperature (Temperature 1) at which a ternary composite hydroxide was heated and a temperature (Temperature 2) at which a mixture of the ternary composite oxide and lithium hydroxide, 1-hydrate was heated were changed, respectively, as shown in Table 2. Further, except that those positive electrode-active materials were used, lithium-ion secondary batteries were constituted under the same conditions as the constitution of Battery A in Example 1, and referred to as Batteries E to S, respectively.

TABLE 2

| Battery | Positive electrode active material | Temperature 1 (° C.) | Temperature 2 (° C.) |
|---|---|---|---|
| E | $LiNi_{0.85}Co_{0.05}Al_{0.1}O_2$ | 900 | 800 |
| F | $LiNi_{0.8}Co_{0.1}Al_{0.1}O_2$ | 900 | 800 |
| G | $LiNi_{0.55}Co_{0.35}Al_{0.1}O_2$ | 900 | 800 |
| H | $LiNi_{0.5}Co_{0.4}Al_{0.1}O_2$ | 900 | 800 |
| I | $LiNi_{0.77}Co_{0.2}Al_{0.03}O_2$ | 900 | 800 |
| J | $LiNi_{0.6}Co_{0.2}Al_{0.2}O_2$ | 900 | 800 |
| K | $LiNi_{0.55}Co_{0.2}Al_{0.25}O_2$ | 900 | 800 |
| L | $LiNi_{0.7}Co_{0.2}Al_{0.1}O_2$ | 600 | 800 |
| M | $LiNi_{0.7}Co_{0.2}Al_{0.1}O_2$ | 800 | 800 |
| N | $LiNi_{0.7}Co_{0.2}Al_{0.1}O_2$ | 950 | 800 |
| O | $LiNi_{0.7}Co_{0.2}Al_{0.1}O_2$ | 1000 | 800 |
| P | $LiNi_{0.7}Co_{0.2}Al_{0.1}O_2$ | 1100 | 800 |
| Q | $LiNi_{0.7}Co_{0.2}Al_{0.1}O_2$ | 900 | 700 |
| R | $LiNi_{0.7}Co_{0.2}Al_{0.1}O_2$ | 900 | 850 |
| S | $LiNi_{0.7}Co_{0.2}Al_{0.1}O_2$ | 900 | 900 |

The respective mean primary particle sizes, mean secondary particle sizes and BET specific surface areas of the positive electrode active materials used for Batteries E to S are shown in Table 3.

Further, the respective battery capacities of Batteries E to S at 25° C. and the respective direct current internal resistance thereof at 0° C. were measured in the same manner as in Example 1. The results are shown in Table. 3.

TABLE 3

| Battery | Mean primary particle size (μm) | Mean secondary particle size (μm) | BET specific surface area (m²/g) | Battery capacity (Ah) | Direct Current internal resistance (mΩ) |
|---|---|---|---|---|---|
| E | 0.7 | 10.2 | 0.7 | 2.15 | 22.5 |
| F | 0.7 | 11.0 | 0.6 | 2.12 | 17.8 |

TABLE 3-continued

| Battery | Mean primary particle size (μm) | Mean secondary particle size (μm) | BET specific surface area (m²/g) | Battery capacity (Ah) | Direct Current internal resistance (mΩ) |
|---|---|---|---|---|---|
| G | 0.9 | 9.8 | 0.4 | 1.98 | 16.7 |
| H | 0.8 | 9.9 | 0.6 | 1.86 | 21.2 |
| I | 0.5 | 10.3 | 0.7 | 2.19 | 18.8 |
| J | 0.4 | 9.5 | 0.8 | 2.08 | 16.9 |
| K | 0.4 | 9.3 | 0.7 | 1.95 | 20.6 |
| L | 0.3 | 10.8 | 0.8 | 1.79 | 17.9 |
| M | 0.4 | 10.3 | 0.8 | 2.10 | 16.8 |
| N | 0.9 | 9.5 | 0.3 | 2.02 | 17.0 |
| O | 0.8 | 9.9 | 0.4 | 1.84 | 18.5 |
| P | 0.7 | 10.3 | 0.5 | 1.74 | 23.1 |
| Q | 0.6 | 11.1 | 0.7 | 2.19 | 17.1 |
| R | 0.8 | 10.6 | 0.4 | 2.08 | 17.8 |
| S | 0.8 | 10.1 | 0.3 | 1.70 | 23.2 |

It is found from the results shown in Table 3 that a battery capacity and direct current internal resistance undergoes drastic changes, owing to a composition of metal elements contained in a positive electrode active material, a temperature (Temperature 1) at which a ternary composite hydroxide is heated and a temperature (Temperature 2) at which a mixture of the ternary composite oxide and lithium hydroxide, 1-hydrate is heated.

The following is understood from the results of Batteries E to H, each having a different Co content.

As for Battery E with the Co content being as small as 5 mol % of a total metal element content, the battery capacity is large, but the direct current internal resistance cannot be reduced in enough an amount to achieve satisfactory high output; as for Battery H with the Co content being as large as 40 mol % of the total metal element content, the direct current internal resistance becomes larger and the battery capacity considerably decreases. It can thus be said that the suitable Co content is not less than 10 mol % and not more than 35 mol % of the total metal element content.

The following is understood from the results of Batteries I to K with different Al contents.

As for Battery I with the Al content being 3 mol % of the total metal element content, the direct current internal resistance at 0° C. is 18.8 mΩ, which is relatively small. Considering that the direct current internal resistance of Battery C, not containing Al, is 25.8 mΩ, it is thought that the use of the production method of the present invention produces a large effect of achieving high output even when the Al content is as small as 3 mol % of the total metal element content. As for Battery K with the Al content being 25 mol % of the total metal element content, the direct current internal resistance tends to increase. It is therefore thought that the preferable Al content is not less than 3 mol % and not more than 20 mol %, and with the results of Example 1 taken into consideration, the most suitable Al content is not less than 10 mol % and not more than 20 mol %.

As for Battery L, whose production process comprises heating of nickel hydroxide at 600° C., the direct current internal resistance has a tendency to decrease, indicating that a more significant effect can be obtained as compared with Battery D, whose production process comprises heating at 500° C. It is found, however, that Batteries M, N and A, whose production processes comprise heating at 800° C., 950, and 900° C., respectively, produce a greater effect of achieving high output than Battery L.

As for Battery P, whose production process comprises heating at 1100° C., there is a tendency toward an increase in direct current internal resistance. Presumably, this is because heating of the nickel hydroxide at 1100° C. causes sintering of nickel oxide, making the subsequent reaction with lithium hydroxide irregular. It can accordingly be said that the temperature at which the nickel hydroxide is heated needs to be not lower than 600° C. and not higher than 1000° C., and particularly preferably not lower than 800° C. and not higher than 950° C.

As for Battery S, whose production process comprises heating of the nickel oxide and a lithium compound at 900° C. the battery capacity considerably decreases with increasing direct current internal resistance. Presumably this is because the reaction of the nickel oxide with the lithium compound at 900° C. induces such a structural change as shifting of part of Li atoms to the site of Ni atoms, resulting in lowering of the quality of the layered hexagonal structure and a decrease in battery capacity.

It is thought, meanwhile, that when the nickel oxide and a lithium compound are heated at a low temperature lower than 700° C., the reactivity decreases, making it impossible to obtain a single-phase lithium-nickel composite oxide. It is therefore of necessity that the nickel oxide and a lithium compound are heated at a temperature not lower than 700° C. and not higher than 850° C.

As thus described, according to the present invention, a non-aqueous electrolyte secondary battery having high output power can be obtained by reducing direct current internal resistance of the battery.

It is to be noted that, although Al was used as the element M to be contained in the positive electrode active material in each of the above examples, almost the same effect can be obtained even by the use of Ti or Sn as the element M. However, the effect of the present invention is greatest with Al used as the element M.

Although a non-graphitizing carbon was used as the negative electrode active material in each of the above examples, a highly crystalline graphite material can also be used. Given a long pulse charge/discharge cycle life, however, a non-graphitizing carbon whose volume remains almost unchanged during charge/discharge and which generates just a little stress in absorbing Li is more preferably employed.

Although the mixed solvent of PC and DMC was used as the solvent of a non-aqueous electrolyte in each of the above examples, conventionally-known carbonic acid esters such as ethylene carbonate, ethyl methyl carbonate, diethyl carbonate, and other non-aqueous solvents can be applied without any specific limitation. Solvents resistant to a 4V-class redox potential can be used singly or in combination of two or more of them. As for the solute, conventionally-known ones such as $LiBF_4$, $LiClO_4$ are usable without any particular limitation.

Although the cylindrical battery was used for the description in each of the above examples, the battery shape is not particularly limited; a similar effect can be obtained in using a prismatic battery constituted by winding electrodes with a substantially oval cross section to be housed in a prismatic battery case, a prismatic battery constituted by stacking a plurality of thin electrodes to be housed in a prismatic battery case, and the like.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

The invention claimed is:

1. A production method of a positive electrode active material for a non-aqueous electrolyte secondary battery, comprising:

(a) a step of providing a nickel hydroxide (x) which is represented by the general formula $$Ni_{1-(x+y)}Co_xM_y(OH)_2,$$

where $0.1 \leq x \leq 0.35$ and $0.03 \leq y \leq 0.2$ are satisfied and M is at least one selected from the group consisting of Al, Ti and Sn;

(b) a step of heating said nickel hydroxide (x) at a temperature not lower than 800° C. and not higher than 950° C. to produce a nickel oxide (y) which is represented by the general formula $$Ni_{1-(x+y)}Co_xM_yO,$$

where $0.1 \leq x \leq 0.35$ and $0.03 \leq y \leq 0.2$ are satisfied and M is at least one selected from the group consisting of Al, Ti and Sn; and (c) a step of mixing said nickel oxide (y) with a lithium compound to obtain a mixture and heating said mixture at a temperature not lower than 700° C. and not higher than 850° C. to produce a lithium-containing composite oxide (z) which is represented by the general formula $$LiNi_{1-(x+y)}Co_xM_yO_2,$$

where $0.1 \leq x \leq 0.35$ and $0.03 \leq y \leq 0.2$ are satisfied and M is at least one selected from the group consisting of Al, Ti and Sn.

2. The production method of a positive electrode active material for a non-aqueous electrolyte secondary battery in accordance with claim 1, wherein said step (a) of providing a nickel hydroxide comprises neutralizing an aqueous solution containing a nickel salt, a cobalt salt and an M salt to coprecipitate a ternary composite hydroxide and drying said ternary composite hydroxide.

3. The production method of a positive electrode active material for a non-aqueous electrolyte secondary battery in accordance with claim 1, wherein said element M is Al.

* * * * *